Feb. 21, 1939.    W. W. KEMP    2,148,204
HEATING APPARATUS
Original Filed May 10, 1932    4 Sheets-Sheet 1

Inventor
William Wallace Kemp
By Cushman, Bryant, Darby & Cushman
Attorneys

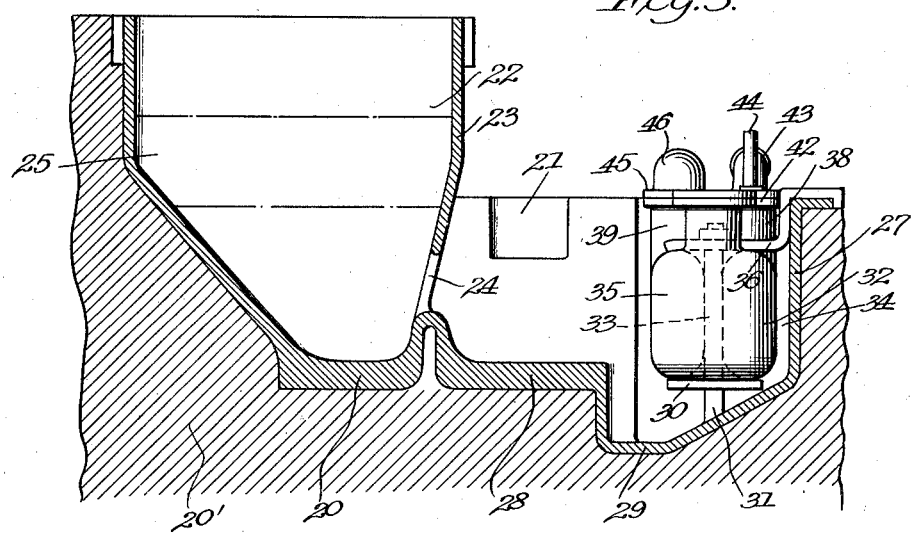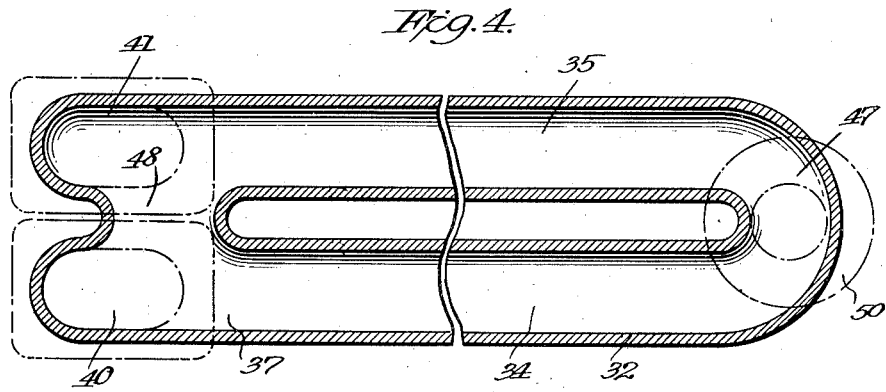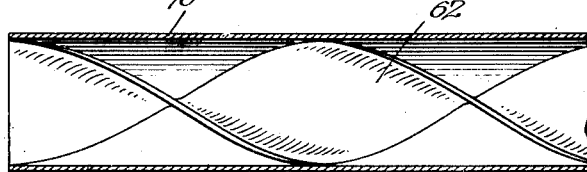

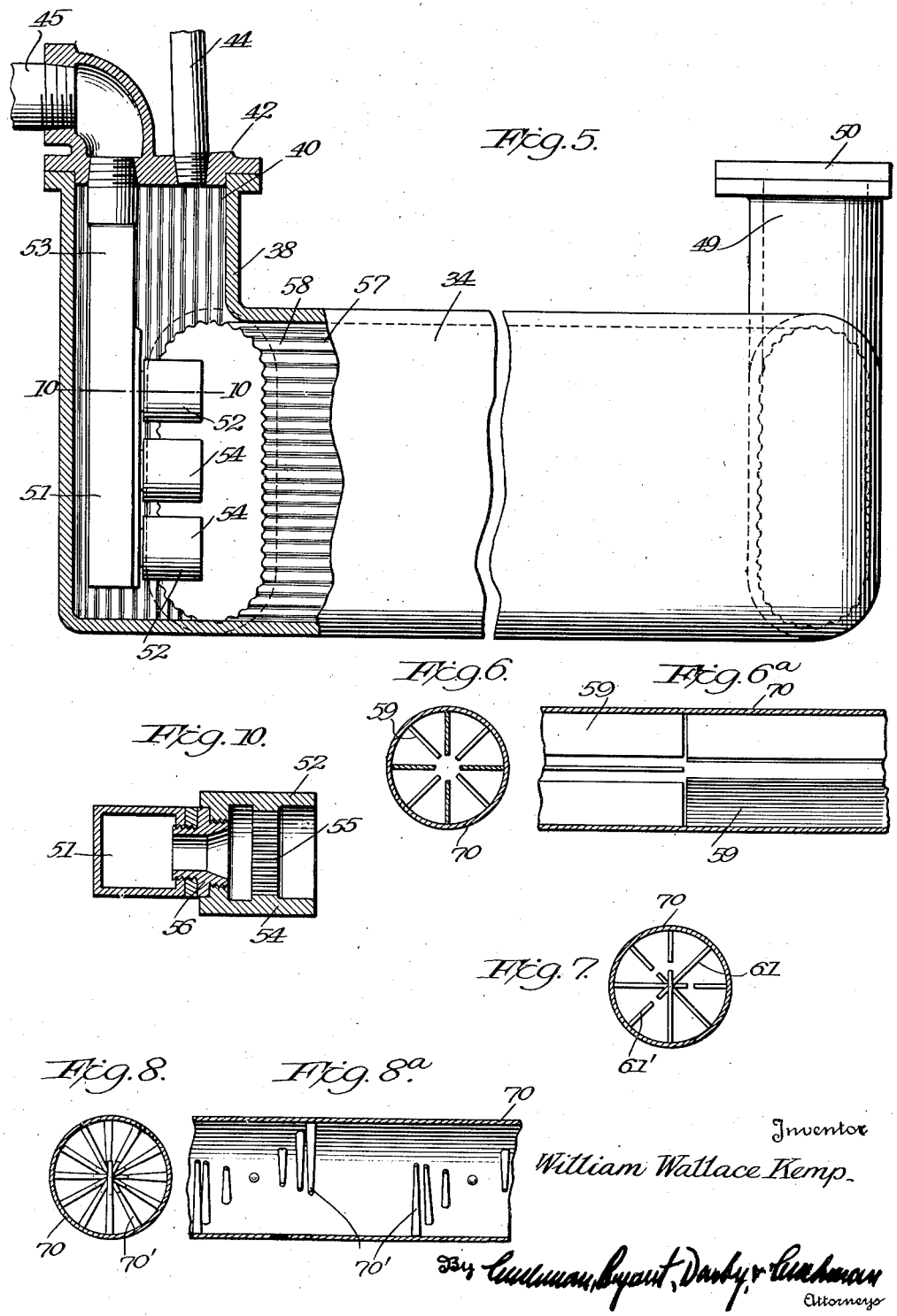

Feb. 21, 1939.　　　W. W. KEMP　　　2,148,204
HEATING APPARATUS
Original Filed May 10, 1932　　4 Sheets-Sheet 4

Inventor
William Wallace Kemp
Attorneys

Patented Feb. 21, 1939

2,148,204

UNITED STATES PATENT OFFICE 2,148,204

HEATING APPARATUS

William Wallace Kemp, Baltimore, Md., assignor to The C. M. Kemp Mfg. Company, Baltimore, Md., a corporation of Maryland Original application May 10, 1932, Serial No. 610,492. Divided and this application August 23, 1934, Serial No. 741,187

2 Claims. (Cl. 126—343.5)

The present invention relates to an apparatus for heating materials by means of an immersed or submerged heating element, being a division of my application for Heating apparatus, Serial No. 610,492, filed May 10, 1932. More particularly, the invention comprises an apparatus for heating metal treating baths. The invention is also applicable for use in pots for melting metal.

Pots such as are used for metal treating baths and pots for melting metal are usually externally heated, that is, the heat is applied to the outer walls of the pot or receptacle. In a structure of this type, the greater part of the lower exterior surface of the pot must be clear of any supporting means in order that the heating medium may come into direct contact therewith and the pot is, therefore, usually supported by a flange at its upper edge. This necessitates providing a pot with a relatively thick wall in order that it may support the load of the bath or molten metal. Because of the thickness of the pot wall, it is necessary to apply considerably more heat thereto than is actually needed to bring the contents of the pot to the desired temperature and the temperature of the contents of the pot does not sensitively respond to the temperature of the heating medium. By the external method of heating, the temperature of the furnace chamber surrounding the pot is necessarily greatly above that of the contents of the pot and the flue gases carry off a large amount of waste heat.

My invention contemplates the heating of metal treating pots and melting pots by means of a heating element which is immersed or submerged in the contents of the pot. The immersion of the heating element in the pot permits the use of a pot having a wall of relatively small cross section, since the entire lower surface of the pot may be supported directly in a bed or casing of insulating material, thereby greatly reducing the cost of installation. Also, since the heating medium is applied directly to the material itself, rather than to the wall of the container, there is a tremendous saving in fuel, and at the same time the temperature of the bath is highly responsive to changes in the temperature of the heating medium and may be very accurately regulated by control of the heating medium. Inasmuch as the immersion element serves the purpose of a heat transferring medium only, the cross section of its wall is but a fraction of that of the usual pot wall and this factor enables rapid heat transfer so that the maximum heating value may be derived from the heating medium.

With the external method of heating bath pots or metal melting pots, the heating medium applied to the pot must be very carefully regulated and kept low at the start of the heating operation, because the sudden application of a high temperature to the pot will cause the metal in the lower part of the pot to become molten and expand, while the metal in the upper portion of the pot yet remains solid. This causes a stress upon the walls of the pot with the probable result that the pot will be broken. With my invention, if a vent extending to the surface of the metal is used, a high temperature may be applied to the cold, solid metal in the pot at the outset of the heating operation due to the fact that he vent will be heated by the passage of the heating medium therethrough, thereby causing the metal about the vent, as well as immediately adjacent the heating element, to be melted. The presence of the molten metal about the vent pipe and extending up to the surface of the metal in the pot permits all expansion to be accommodated at this point until the remainder of the metal has become molten. Therefore, with my invention, considerable time is saved in bringing the pot to a working temperature.

Another advantage resulting from the use of an immersed heating element is that the pot need not be operated at its full capacity, since the supply of heating medium may be directly adjusted to the feed of the materials passed through the pot. In external heating practice, when the pot is not filled to capacity, air currents filtering into the combustion chamber and pot extract heat from both the pot and its supporting structure. By spacing the heating elements through the entire contents of the pot and by providing the heating elements with an adequate amount of surface, it is never necessary to carry a high temperature differential between the heating elements and the contents of the pot. In other words, the heat need only be supplied as rapidly as the material being heated can absorb it and dross formation from this common source is thus greatly minimized.

An important advantage of my structure is the speed with which the pot can be brought into service. Since there is no barrier to heat flow— nothing to absorb heat save the material to be heated—large units can be brought into service in a relatively short time.

Immersion heating units constructed in accordance with my invention are preferably equipped with heating burners or heating means which are readily removable from the heating unit and the heating elements themselves are removable from the pot in which they are positioned. It is obvious from this that the heating of a particular pot may be varied over a wide range without affecting the fixed installation. I preferably confine the flame or other heating medium entirely within the heating element and exposed flames are thereby eliminated. The heating medium used in my apparatus is preferably a mixture of air and gas or oil combined in such proportions that the mixture is flame sustaining; that is, sufficient oxygen is present in the mixture to completely burn the fuel mixed therewith and no secondary air is required. My heating element is preferably of such construction that the products of combustion passing therethrough have a continuous circulatory movement. The rate of transfer or flow of heat from the gas to a metal is very much slower than the flow of heat from one metal to another, and it follows from this, that the flow of heat from the heating medium used with my invention to the walls of the metal heating element occurs at a much slower rate than the transfer of heat from the heating element to the tin, lead or other metal in which the heating element is immersed, and I find it desirable to so construct the heating element that it will more rapidly accumulate the heat from the heating medium. The means used for this purpose may be corrugations on the inner wall of the heating element, or vanes, fins or spirals arranged on the interior of the heating element. However, any means or arrangement whereby more metal on the interior of the heating element is exposed to the heating medium will increase the rate at which heat is accumulated by the heating element from the heating medium, although the particular means mentioned above are desirable in that they cause the heating medium to exert a scrubbing action upon them as it passes through the heating element. Transfer of the heat from the heating medium to the heating element is also more thoroughly accomplished if the pins or vanes or the like are projected sufficiently far into the heating element to break up the more rapidly moving central core of products of combustion.

In the drawings,

Figure 3 is a vertical section on the line 3—3 of Figure 1;

Figure 4 is a longitudinal horizontal section of the heating element used in the apparatuses of Figures 1, 2, and 3, taken on the line 4—4 of Figure 2, upper portions of the heating element being shown in dotted lines;

Figure 5 is a vertical longitudinal section of the heating element shown in Figure 1, parts of the element being shown in full lines;

Figure 6 is a transverse section through one of the runs of a heating element showing a modified arrangement of heat accumulating means;

Figure 6a is a longitudinal section through the device of Figure 6;

Figure 7 is a view similar to Figure 6 showing another form of heat accumulating means;

Figure 8 is a view similar to Figure 6 showing a modified form of heat accumulating means;

Figure 8a is a longitudinal section through the device of Figure 8;

Figure 9 is a view similar to Figure 6, showing still another modified form of heat accumulating means;

Figure 9a is a section through the heating element of Figure 9 with one side wall of the heating element removed;

Figure 10 is a horizontal sectional view of one of the burner nozzles taken on the line 10—10 of Figure 5;

Figure 1:
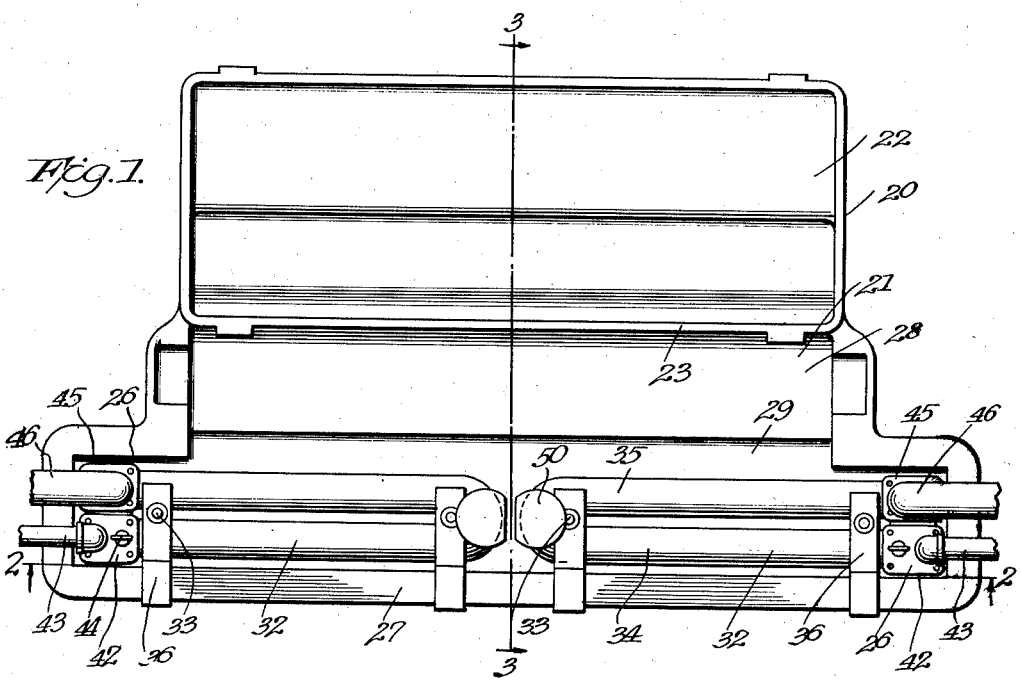
Figure 1 is a plan elevation of a pot for tinning steel sheets provided with the heater of my invention.
Figure 2:
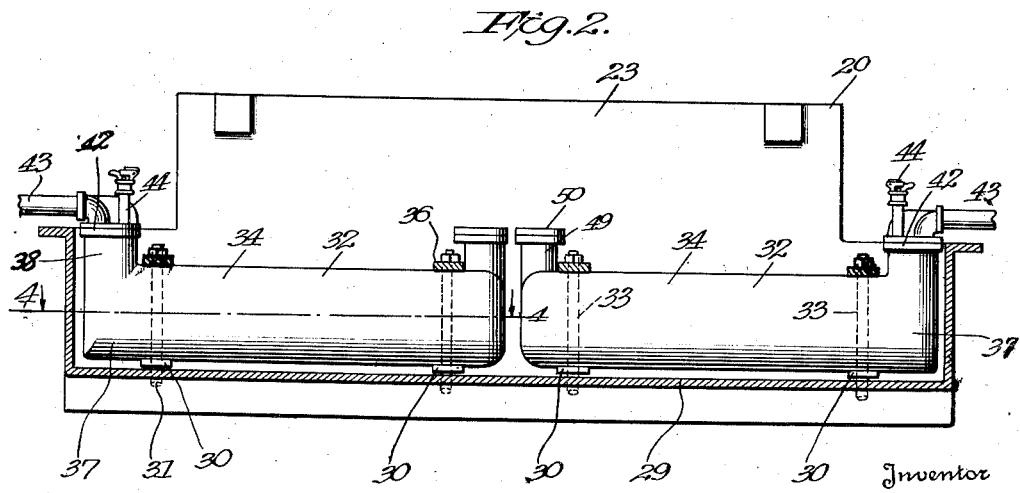
Figure 2 is a vertical section taken on the line 2—2 of Figure 1.

Referring to Figures 1 to 4, inclusive, the numeral 20 designates a pot for tinning steel sheets or making what is known as tinplate and which is supported in a bed of insulating material 20', as shown in Figure 3, and divided into two compartments 21 and 22, which compartments are separated by an upwardly extending partial partition wall 23. A horizontally elongated aperture 24 is provided in the lower portion of the wall 23 so that the two compartments communicate. The compartments 21 and 22 are normally filled with molten tin, the surface of the tin being adjacent the upper edge of the compartment 21. The compartment 22 contains a stratum of oil 25 above the level of the molten metal therein in accordance with the usual practice. Compartment 21 includes lengthened or offset end portions or chambers 26 adjacent its side wall 27 and the bottom wall 28 of the compartment 21 includes a depressed portion 29 between the end walls of the end chambers 26. Spaced platforms or supports 30 are provided in the depressed portion 39, the platforms 30 being mounted upon posts 31. Elongated endless heating units 32 formed of a suitable alloy or material to properly conduct the heat and capable of withstanding the temperatures to be employed are supported on the platforms 30, two such heating units being normally provided, end to end, as shown. The heating units are secured to the platforms 30 by means of posts 33 extending upwardly from the platforms 30 between the runs 34 and 35 of each of the units. The upper ends of the posts 33 are threaded to receive nuts which secure clamps 36 down against the upper surfaces of the runs of the heating elements, the clamps 36 being provided with anchoring end portions which extend over the upper edge of the side wall 27 of the compartment 21.

Each of the heating units 32 is provided at its outer end 37 within the end chambers 26 of the pot 20 with upwardly projecting extensions 38 and 39 which are respectively provided with inlet and vent apertures 40 and 41. The aperture 40 is provided with an inlet plate 42 which may be secured to the extension 38 by means of screws or the like. A fuel feeding pipe 43 is threaded into the inlet plate 42 to supply any suitable fuel, although it is preferably connected to a gas and air mixing apparatus wherein air and gas are mixed in such proportions that the mixture is flame sustaining; that is, sufficient oxygen is in the mixture to completely burn the gas mixed therewith and no additional supporter of combustion is required. The inlet plate 42 is also provided with a lighter port 44 which may normally be closed by any suitable means. A vent plate 45 is fitted upon the vent aperture 41 and a vent pipe 46 is connected to this plate.

As has been stated, each of the heating elements 32 is endless and is substantially of the form of an open rectangle of considerably greater length than breadth, the runs 34 and 35 comprising the longer sides. The outer ends of the runs are joined by a passage 47 and their inner ends, that is, their ends adjacent the apertures 38 and 39, communicate through a passage 48. Each of the runs is relatively narow in horizontal cross section but has a substantial depth, as is best shown in Figures 4 and 5, so that the entire heating element will occupy a minimum of space in a horizontal plane, but will provide a maximum heating surface. The passages 47 and 48 conform to the cross section of the runs 34 and 35. As will be understood from Figures 2 and 3 of the drawing, the entire area of the runs is immersed in the mass in the pot 20 and since the heating elements are positioned closely adjacent the infeed side 27 of the pot 20, they will not form an obstacle to the feeding of steel sheets or other material into the pot. I find that the sheets passing through the bath cause the heat of the heating elements 32 to be transmitted entirely through the bath. Casting of the heating element 32 is facilitated by providing an apertured extension 49 in the upper surface of the passage 47. This is subsequently closed by a plate 50.

Because of the vertical depth of the runs of the heating element 32, it is desirable to provide a burner 51 which is fitted with a plurality of vertically spaced burner heads or jets 52, as is best shown in Figure 5, so that the flames issuing from the burner 51 will substantially fill the inner area of the runs. The burner 51 illustrated comprises a pipe 53 depending through the extension 38 from the inlet plate 42, where it is connected to the fuel feed pipe 45, as shown in Figure 5. Each of the vertically spaced burner nozzles 52 comprises a jet portion 54 provided with an apertured wall 55, the flames issuing through these jets into the run 34. The jets 54 are fixed to the burner pipe 53 by a union 56. The products of combustion resulting from the flame at the nozzles 52 will, because of the pressure of the fuel, move along the run 34 of the heating element at high velocity and will return through the run 35. The greater part of the products of combustion will pass from the run 35 back to the run 34 through the passage 48, resulting in a circular course of travel on the part of the products of combustion. In passing the nozzles 52, the products of combustion will be re-heated by the flames issuing from the nozzles.

In the use of the tinning pot of this construction, the metal to be tinned will be fed into the pot over the side wall 27 by feed rollers or the like from the usual fluxing bath, not shown. The sheets will be passed above the runs of the heating element and beneath the level of the molten metal in the compartment 21. The sheets of metal will then be passed through the aperture 24 in the partition wall 23 and upwardly in the compartment 22, from which they will be removed in the usual manner.

By the use of my system of heating heat treating baths, a very large portion of the weight of such installations is eliminated and the pots used in the installations have a considerably lower cost because of the fact that it is unnecessary to provide a pot having a wall of the thickness of the wall of the pot which must be used when an external system of heating is employed. Inasmuch as the externally fired pot must act as a supporting container for the bath, its wall thickness is sometimes as much as twenty times that of the walls of the pot of an immersion unit. The pot used with the immersion unit being supported in the insulating seating 20', as shown in Figure 3, the weight of the material in the pot is supported throughout by this seating rather than by a flange or rim or piers.

Figures 5 to 9, inclusive illustrate various arrangements upon the inner surface of my heating elements whereby the heat of the products of combustion passing through the heating element may be more readily transferred to the walls of the element. In Figure 5, the inner surface 57 of the heating element 32 is shown to be corrugated as at 58 so as to provide a large surface area upon which the products of combustion may act. I find that this construction of the inner surface of element 32 causes the heating element to accumulate the greater part of the heat values from the products of combustion with the result that when the products of combustion pass from the vent 46, their temperature is very little higher than that of the material in which the heating element is immersed. The corrugations 58, in effect, scrub the products of combustion passing through the heating element and thereby remove a much greater number of heat units from the gases than would ordinarily be the case. In cast metal heating elements, I preferably provide corrugations as described above. However, in heating elements formed of steel or other fabricated metal, I find it desirable to use the heat accumulating means shown in Figures 6 to 9a, inclusive. In Figures 6 and 6a, vanes 59 are shown positioned inside a welded steel heating element 70 having runs of circular cross section. The vanes 59 are preferably straight and are arranged in groups along the length of the runs, each group preferably comprising four vanes arranged at right angles to each other as shown in Figure 6. The vanes of adjacent groups are angularly staggered with respect to each other in the manner shown in Figures 6 and 6a. Figure 7 shows complementary pins 61 and 61' arranged in the run of the steel heating element, the pins 61 being sufficiently long to extend past the center of the run while the pins 61' extend to a point adjacent the inner end of the pins 61. Pairs of pins 61 and 61' are spaced along the length of the runs, the adjacent pairs being angularly disposed with respect to each other to provide the arrangement shown in Figure 7. In Figures 8 and 8a, pins 70' are arranged along the interior of a heating element 70 in a spiral row. These pins project past the center of the run.

It is important that the vanes and pins used in the structures of Figures 6 to 8a, inclusive, project substantially to the center of the run or past the center of the run in the manner shown in these figures. As is well known, the center core of the products of combustion moving through the heating element will travel more rapidly than the surrounding gases which move against the surface of the heating element. By having vanes or pins projected to the central portion of the heating element, this core will be broken up and mixed with the surrounding products of combustion to give the whole a more uniform temperature.

Figures 9 and 9a show a spiral plate 62 positioned within the heating element 70 and in contact with the inner wall thereof to increase the heat accumulating surface and to cause the products of combustion to have a whirling motion during their passage through the heating element, thereby increasing the scrubbing effect mentioned above.

Figure 11:
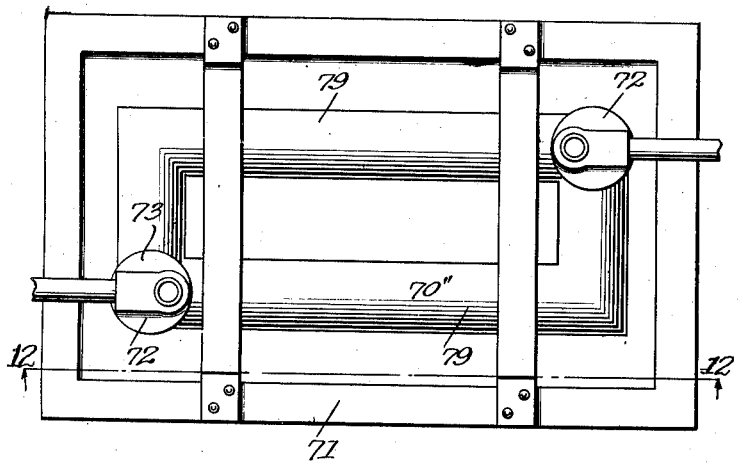
Figure 11 is a plan view of a heat treating bath provided with a modified form of the heat radiating element.
Figure 12:
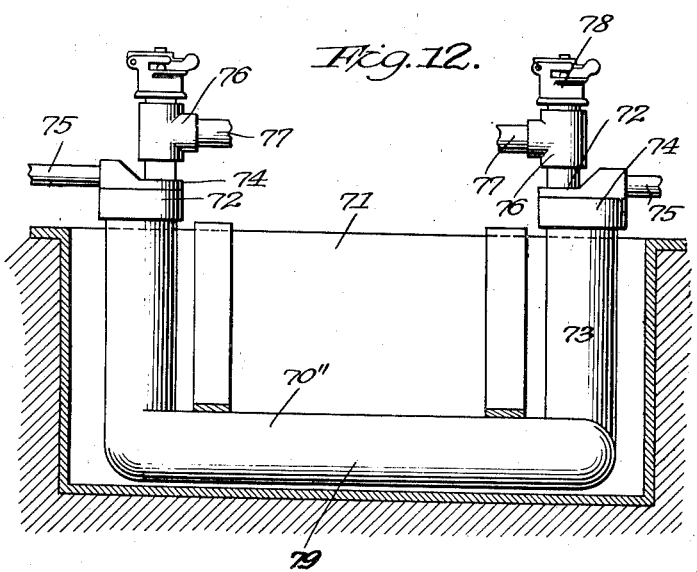
Figure 12 is a vertical section on the line 12—12 of Figure 11.

Since the heat accumulated in the walls of the heating elements is very readily transferred to the material in which the heating element is immersed, particularly when this material is metal, it is not generally necessary to modify the outer surface of the element to accomplish this transfer Figures 11 and 12 illustrate a modified form of heating element designated by the numeral 70", which is preferably in the form of an open rectangle and is particularly designed for use in a salt bath, the element 70" being positioned in a substantially rectangular tank 71. Two burners 72 are preferably used in this construction, one of the burners being positioned in each of a pair of vertical pipes or casings 72 which extend upwardly from diagonally opposed corners of the rectangular element 70". Casing heads 74 are secured to the upper ends of the upstanding casing elements 73 and burners of the type shown in Figures 5 and 10 are supported in these heads, the burner jets or nozzles being positioned down within the heating element 70". A fuel pipe 75 supplies fuel to the burner element. The casing heads 74 are likewise provided with a vent fitting 76 to remove surplus products of combustion. A vent pipe 77 is connected to the vent fitting and preferably extends at right angles from the latter so that a lighter port 78 and a closure therefor may be provided at the upper end of the vent fitting. The burners are positioned at the lower ends of the upstanding casings 73 so that the burner jets thereof will direct a flame along each of the longer runs 79 of the element 70'. By providing burners at the two diagonally opposed points in the heating element, I am enabled to provide a substantially continuous circular movement of the products of combustion in the element and the entire bath will be kept at an even temperature.

When my heating elements are used in a metal heating pot of average depth and with a vent tube extending up through the surface of the metal when the metal is cold and solid, the heated gases passing up through the vent tube melt the metal thereabout and up to the surface, at the same time that the metal about the heating element itself is being melted. The pressure caused by the metal melting about the heating element can thus escape to the surface and internal stresses in the metal will be relieved.

It will be understood that the various forms of heating elements described in the present application are generally interchangeable with respect to the various forms of pots and baths. It is also important to note that the heating elements are so constructed and supported with respect to the heating pots that they are removable therefrom. Furthermore, in most of the heating element structures described, the burner is removable from the inlet mouth of the heating element. Heating elements of my invention may be used with any of the pots now in use and originally constructed for external heating.

I claim:—

1. In a heating apparatus for a mass having the characteristic of being solid at normal temperature and fluent at higher temperatures, a container for the mass, a tubular heating element comprising two leg portions communicating at their respective ends to form a continuous passage, said element being positioned adjacent and parallel to the bottom wall of the container to be immersed in the mass in the container, a vertical tubular column opening to an end of said element and extending to the top of the container, a burner connection extending into the top of said column, a burner at the lower end of said connection to project products of combustion into and along one of the leg portions of said element, a vent in said column above said heating element and out of the direct line of movement of products of combustion moving about in said elements, so that such products projected by said burner will tend to recirculate through said element, surplus products of combustion passing out of the element through said vent.

2. In a heating apparatus for a mass having the characteristic of being solid at normal temperature and fluent at higher temperatures, a substantially open-topped container having side and end walls, a tubular heating element formed of two leg portions communicating at their respective ends to form a continuous passage, said element being positioned adjacent and parallel to the bottom of the container so as to be immersed in the mass in the container, a vertical tubular column adjacent a side wall of said container opening to the upper wall of an end of said element and extending to the top of the container, a burner connection extending down into said column and adapted to have its outer end communicate with a source of fuel under pressure, a burner in said element at the lower end of said connection to project products of combustion into and along one of the leg portions of said element, said burner being adjacent the lower end of said column with its jet facing away from said column, a vertically extending vent in said column and having the port thereof which communicates with said heating element positioned above and out of the direct line of movement of products of combustion moving about said element, so that such products projected by the burner will be urged to recirculate through the element by the pressure of the flame at said burner, surplus products of combustion passing out of the element through said vent.

WILLIAM WALLACE KEMP.